Figure 1:
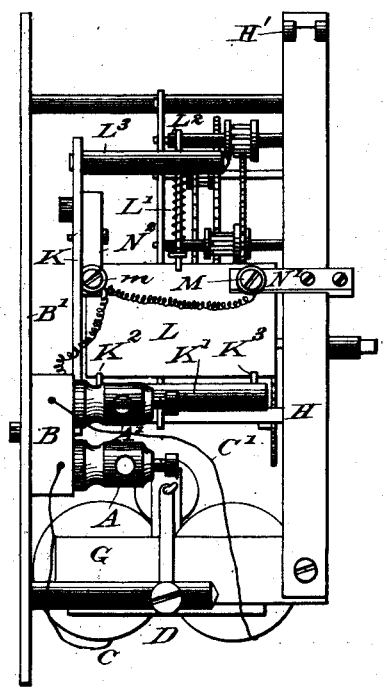

(No Model.) 2 Sheets—Sheet 1.

A. B. JONES.
ELECTRICAL CLOCK.

No. 419,776. Patented Jan. 21, 1890.

Witnesses:
H. Clark Ford
J. H. Lapham

Inventor:
A. B. Jones
W. H. Burridge
Atty.

(No Model.) 2 Sheets—Sheet 2.

A. B. JONES.
ELECTRICAL CLOCK.

No. 419,776. Patented Jan. 21, 1890.

Witnesses:

Inventor:
A. B. Jones

UNITED STATES PATENT OFFICE.

ANSEL B. JONES, OF CLEVELAND, OHIO.

ELECTRICAL CLOCK.

SPECIFICATION forming part of Letters Patent No. 419,776, dated January 21, 1890.

Application filed January 17, 1887. Serial No. 224,646. (No model.)

*To all whom it may concern:*

Be it known that I, ANSEL B. JONES, of Cleveland, in the county of Cuyahoga and State of Ohio, have invented a certain new and Improved Electrical Clock; and I do hereby declare that the following is a full, clear, and complete description thereof.

My improvement in electric clocks consists more especially in the mechanism for applying the force or power of an electro-magnet in such manner as to produce more accurate results in a time-measuring instrument commonly called a "clock," the accuracy of which depends entirely upon the uniformity of the force acting upon the pendulum or balance, at the same time giving motion to the hands to indicate such measurement of time correctly.

The improvement also consists of devices for acting upon the circuit at the proper time in such a way as to render the said instrument automatic and continuous in its action.

The object of this said improvement is to so apply the force or power of an electro-magnet as to cause at all times a constantly-uniform force or power to the pendulum or balance regardless of the strength or variation of force or power exerted in the electro-magnet, providing the force in said magnet is sufficient to attract the armature thereof.

It is well known that the power of an electro-magnet varies to a great extent on account of changes taking place in the battery, and it is obvious that if this varying force was applied directly it would cause a corresponding variation in the duration of oscillation or beat of the pendulum or balance in this class of time-measuring instruments. This difficulty I have entirely overcome by the improved mechanism herein described, which renders such variable force as is exerted by the magnet uniform and constant in its action upon the pendulum or balance of said electric clock by said force acting upon a spring, which in turn reacts by a step-by-step motion through an ordinary escapement upon the pendulum or balance for a single oscillation only for each magnetization of the electro-magnet. By means of the improved devices the circuit will be so acted upon at the end of the swing or beat of the pendulum or balance as to magnetize or charge the said electro-magnet at such intervals as to give continuous and true motion to the mechanism for admeasurement of time.

A further object is to construct all working parts in such a manner as to give to the same a minimum of frictional resistance, so as to require as little power of battery force as possible.

For a more definite and complete description of said invention reference will be had to the following specification, and to the annexed drawings, making part of the same, in which—

Figure 2:
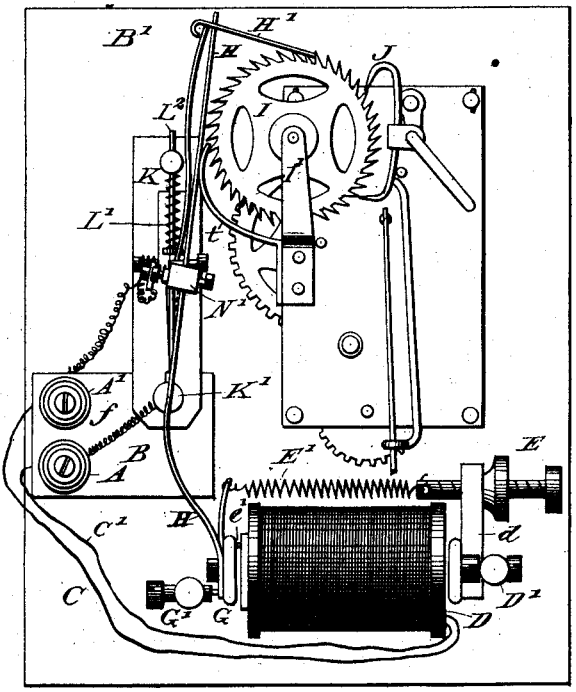
Figure 3:
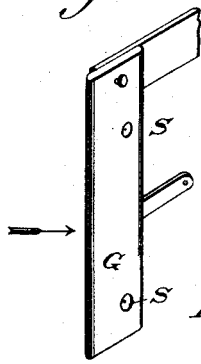
Figures 4, 5:
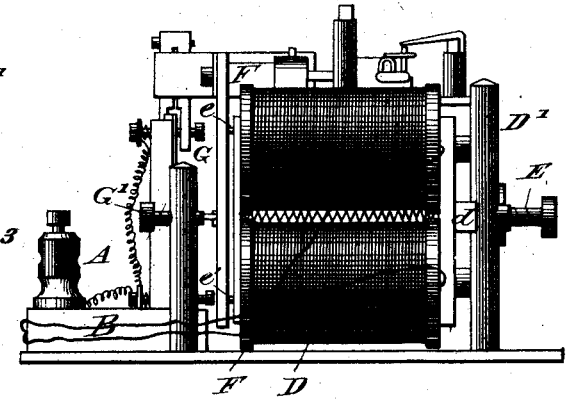
Figure 6:
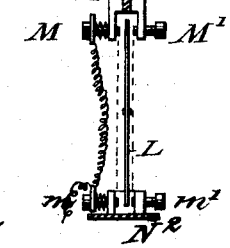
Figure 7:
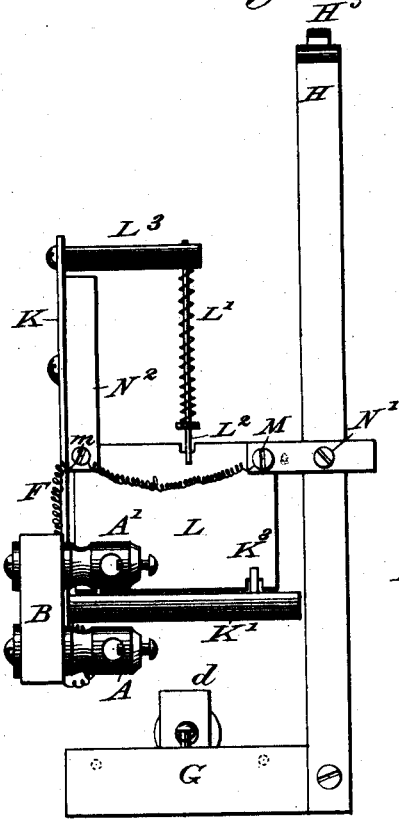
Figure 8:
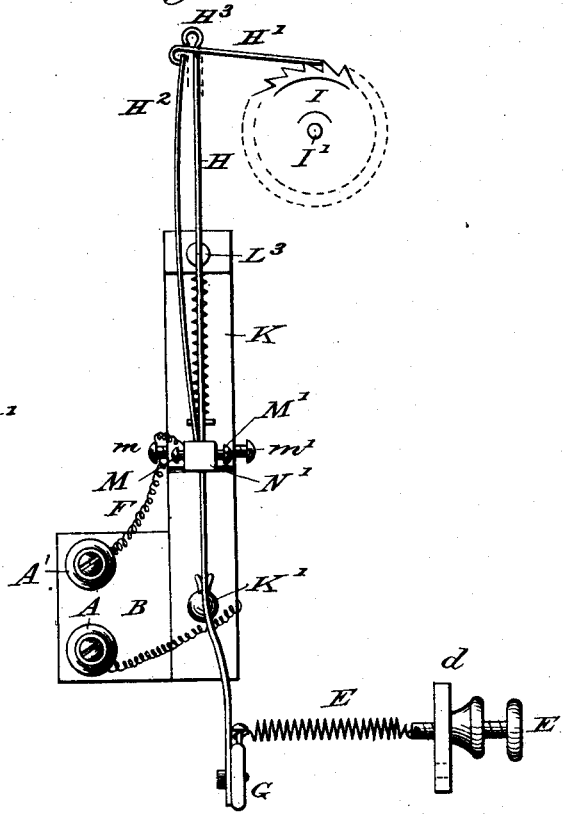

Figure 1 is a side elevation of said invention, showing the binding-posts, the electro-magnet and its armature with lever attached, the contact-plate, and contacts and their connections. Fig. 2 is a front elevation of the same, giving another view of the magnet and armature-lever with pawl at the end and its spring, and showing the retractile spring, which is the mainspring of the clock and has a central position between the spools of the magnet, its attachment to the armature and adjustment-screw, and the contact-breaker or circuit-changer. Fig. 3 is a detached view of the armature, which shows the pivot-holes in the same, which has corresponding pins inserted in the magnet-heads on which the armature rocks. Fig. 4 is a lower end view looking upward from the bottom. Fig. 5 is a detached view of the contact-plate and its spring, the dotted lines showing the action of the same and by which it is thrown in or out of contact with a quick action in either direction from the center line against the contact-screws on one side or the adjustment-screws on the other. Fig. 6 is a detachment showing the connections and action of the double contact, looking downward from the top, showing the upper edge of the contact-plate. The dotted lines indicate the movement of the same from the center line to the screws on either side. Fig. 7 is an enlarged detached side view which shows the construction of the lever, its attachment to the armature, and its relation to the contact-plate. Fig. 8 is an enlarged detached front view which shows the edge of the lever and attachments.

A and A', Figs. 1 and 2, are the binding-posts, to which the wires from the battery are attached, fastened to a block of insulating material B, which is fastened to the supporting-plate B', the wires C C', leading from the binding-post A A', conveying the current to the electro-magnet D, which is supported by the post D', Figs. 2 and 4, which also holds a projection $d$, which supports the adjustment-screw E for the purpose of adjusting the spring E', acting, in the first place, to keep the armature G against or on the pivots $e\ e'$, inserted in the magnets' heads F F', which have corresponding holes S S', Fig. 3, in the armature G, in which they enter and on which the same armature vibrates. By this construction of the supports for the armature I reduce the frictional resistance to the minimum point, I find that the armature responds quickly to the electric current, and may be more easily removed from the magnet when required than when it is hung on trunnions or hinges or in other usual ways. The spring E', Fig. 2, has another important use. When it has been acted upon by the electro-magnet D through its armature G, it will react through the lever H and pawl H', engaging in the teeth of the escapement-wheel I or its equivalent upon the arbor I', which gives motion to the train that carries the clock-hands, which are geared in the usual manner, at the same time acting with a uniform force through the escapement-wheel I and verge J upon the pendulum or balance of one beat only for each magnetization of the electro-magnet D. The escapement-wheel has also another function besides its usual one. It is also a propulsion-wheel, it is the prime mover of the clockwork, and is actuated directly by pawl H', carried on arm H, the latter being attached to the armature G, as herein described. By the attraction of the armature the spring E is in a state of tension, causing the pawl H' to push against the scape-wheel, but not being permitted to act until by the swing of the pendulum a tooth of the wheel is released. The pawl-lever then advancing, the circuit-closing devices are permitted to act, and it is again retracted to be in readiness for another actuation at the next half-oscillation of the pendulum. The thin or slight spring $t$ is used as a retainer or guard to prevent the scape-wheel turning backward with the pawl H', to which is attached the lever H. The said spring $t$ is not, however, essential to the practical operation of the apparatus described. At this point, when the lever H has reached its greatest extent of travel, limited by the screw G', (shown in Fig. 2,) the circuit-changer so acts upon the circuit as to charge the electro-magnet D and its armature G to act upon the spring E' for the next beat, consecutively beat after beat, step by step continuously.

The lever H is a metallic strip made from any suitable sheet metal, and the pawl is made of the same width of material, with a slot cut in it to receive the end of the lever H, which is made somewhat narrower where it passes through, forming a shoulder upon which it has a slight shoving motion. The end of the lever H is bent around to hold it in place, as indicated at H³. The pawl is also bent around, so as to engage the spring H, which presses it against the teeth of the wheel I.

The supporting-plate K of the circuit-changing mechanism is attached to the block of insulating material B, (shown in Fig. 2,) which supports the post K' in electrical connection with the binding-post A, and in which are inserted the slotted pins K² and K³, Figs. 1 and 5. In these rests the contact-plate L, having notches in its edge to correspond to the slots in the pins K² and K³, by which it is held in place and in electrical contact with the post K' and by means of the spring L' and its rod L², supported by the post L³. (See Fig. 7.)

The spring L' has another important use— that of giving to the said contact-plate L a quick action from a central line between the posts K' and L³ to the contact-screws M and $m$ on one side and to the adjusting-screws M' and $m'$ on the other in the reverse direction, with a vibrating motion between the posts K' and L³, as shown by the dotted lines, Figs. 5 and 6, for the purpose of charging and discharging the electro-magnet D at the proper time, governed by the pendulum or balance motion. The said contact-screws M and $m$ and adjusting-screws M' and $m'$ are supported in suitable slotted blocks N² and N', Figs. 2 and 6, of insulating material, so slotted as to admit the edge of the contact-plate and having their respective ends placed directly opposite and in line with said contact-plate. One of these N² is fastened to the supporting-plate K and the other N' to the lever H, moving with the same and carrying the contact-screw M and adjusting-screw M'. The contact-screw M is in the same electrical connection as the contact-screw $m$, the purpose of which is to hold the contact-plate L in electrical connection with the binding-post A' after said contact-plate has left the contact-screw $m$ until it has been carried by the lever H and contact M to a point just past the center line between the posts K' and L³, when it will go with a quick action to the adjusting-screw $m'$ by force of the spring L', Figs. 1, 5, and 6.

The corelation of parts in operation is such that when the leading-wires from an ordinary closed-circuit battery are attached to the respective binding-posts A and A', Fig. 2, forming a continuous circuit by the wires C and C' through the electro-magnet D, its armature will be attracted, moving the lever H and pawl H' back with a quick motion to engage a tooth on the escapement-wheel I or its equivalent, at the same time extending the spring E' for action in the opposite direction. The adjusting-screw M' will then have engaged the top of the contact-plate L and have moved it and its spring L' with its rod L² vibratorily between the respective posts K' and L³, Figs. 1, 2, and 5, from the adjusting-screw $m'$ to a point just past a center line between the said posts K' and L³, as shown by dotted lines in Figs. 5 and 6. Now on the lever H having reached its extent of travel in this direction the contact-plate L will be moved by the spring L' with a quick motion to the contact-screw $m$, making electrical contact with and forming a short circuit through the same plate. This plate is in electrical connection with the binding-post A and the contact-screw $m$, which screw is in electrical connection with the binding-post A', Fig. 2, (indicated at $f$,) which will cut out the magnet D from the main circuit, whereby it will lose its attractive force without breaking the main circuit. The lever H and pawl H' will now by the reaction of the spring E' act in a forward direction upon the escapement-wheel I and verge J or equivalents until the pendulum or balance has finished its duration of beat in either direction, and during this time the contact-screw M, which is in the same electrical connection as the contact-screw $m$, will have come in contact with the top of the contact-plate L and swing it and its spring L', with its rod L², between the posts K' and L³ from the contact-screw $m$ to a point just past a center line between the posts K' and L³, when it will be moved by a quick action from the contact-screw M to the adjusting-screw $m'$, breaking contact in the short circuit after the lever H has arrived at its greatest extent of travel. The pendulum or balance having finished its beat thereby, the circuit-changer admits of the current circulating in the main circuit, acting in the electro-magnet D to charge the same for the next electric action, and so on step by step continuously.

The arrangement of the circuits and contact mechanism herein described are for a closed-circuit battery, which is best adapted to this kind of work. An open-circuit battery, however, can be used by changing the contacts so as to open and close the circuit at the proper time.

What I claim as my invention, and desire to secure by Letters Patent, is—

1. The contact-plate L, spring L', with its rod L², acting with a vibrating motion between the posts K' and L³, with a quick action from a central line between the posts K' and L³ to contacts on either side and supported in the slotted insulating-blocks N and N', substantially as described, and for the purposes set forth.

2. The pivots $e$ and $e'$, inserted in the magnet-heads F and F', upon which the armature G vibrates in corresponding holes S and S', substantially as and for the purpose specified.

3. The spring E', with the magnet D, ratchet I upon the arbor I', verge J, and contact-plate L, in combination with the spring L', contacts M and $m$ in either side of the insulating-blocks N and N', and slotted pins K² and K³, substantially as described, and for the purpose set forth.

4. In an electric clock, the combination, with the escapement thereof and a pendulum, of the pawl H', lever H, armature G, armature-supporting pins $e\ e'$, inserted in the magnet-heads, spring E', and a circuit-changer adapted for a closed circuit, as herein shown and set forth.

5. The combination of an electro-magnet provided with pivots $e\ e'$, an armature G, adapted to vibrate on pivots $e\ e'$, a propelling-spring E', a pawl-actuating lever H, and its pawl H', an escapement-wheel and pendulum with a circuit-changer breaking circuit at the completion of the swing of the pendulum, as herein set forth.

6. A circuit-changer consisting of an insulating-block B, posts A A', plate K, posts L³ K', slotted pins K² K³, contact-plate L, notched in its edge to fit into slotted pins K² K³, spring L', rod L², and post L, adjusting-screws M M' and $m\ m'$, slotted blocks N' N², in combination with suitable electrical connections to an electro-magnet, as herein set forth.

In testimony whereof I affix my signature in presence of two witnesses.

ANSEL B. JONES.

Witnesses:
W. H. BURRIDGE,
E. F. HOPKINS.